United States Patent [19]

Hartman

[11] Patent Number: 5,741,358
[45] Date of Patent: *Apr. 21, 1998

[54] CORROSION INHIBITING COMPOSITION FOR TREATING ASBESTOS CONTAINING MATERIALS

[75] Inventor: Judithann Ruth Hartman, Columbia, Md.

[73] Assignee: W. R. Grace & Co.-Conn., New York, N.Y.

[*] Notice: The term of this patent shall not extend beyond the expiration date of Pat. No. 5,743,841.

[21] Appl. No.: 721,853

[22] Filed: Sep. 27, 1996

[51] Int. Cl.$^6$ ............................................. B09B 3/00
[52] U.S. Cl. ................. 106/699; 106/14.05; 106/625; 106/772; 106/734; 106/815; 106/14.11; 106/14.13; 106/14.15; 428/688; 428/703; 588/242; 588/254; 588/901; 423/167.1; 427/427
[58] Field of Search ................. 106/14.05, 15.05, 106/18.11, 14.13, 14.14, 14.15, 624, 625, 699, 18.14, 18.13, 18.12, 713, 734, 772, 774, 815; 428/688, 703; 588/242, 254, 901; 423/167.1; 427/427

[56] References Cited

U.S. PATENT DOCUMENTS

| | | |
|---|---|---|
| 112,650 | 3/1871 | Stevens . |
| 1,094,505 | 4/1914 | Whitney . |
| 3,297,516 | 1/1967 | Naumann et al. . |
| 3,551,228 | 12/1970 | Meth . |
| 3,867,218 | 2/1975 | Henry . |
| 3,914,184 | 10/1975 | Harada et al. . |
| 3,957,571 | 5/1976 | Bodycomb, Jr. . |
| 3,965,284 | 6/1976 | Xanthos et al. . |
| 4,055,458 | 10/1977 | Niederpriim et al. . |
| 4,328,197 | 5/1982 | Flowers . |
| 4,347,150 | 8/1982 | Arpin . |
| 4,356,057 | 10/1982 | Lalancette et al. . |
| 4,376,673 | 3/1983 | Cheung . |
| 4,395,304 | 7/1983 | Kern et al. . |
| 4,401,636 | 8/1983 | Flowers . |
| 4,402,852 | 9/1983 | Young .................. 106/14.15 |
| 4,474,742 | 10/1984 | Graceffa et al. . |
| 4,495,223 | 1/1985 | Lalancette et al. . |
| 4,555,304 | 11/1985 | Salzle . |
| 4,582,624 | 4/1986 | Enjo et al. . |
| 4,632,847 | 12/1986 | Lomasney et al. . |
| 4,693,755 | 9/1987 | Erzinger . |
| 4,810,280 | 3/1989 | Le Van Mao et al. . |
| 4,812,204 | 3/1989 | Delvaux et al. . |
| 4,818,143 | 4/1989 | Chou . |
| 4,866,105 | 9/1989 | Batdorf . |
| 4,897,213 | 1/1990 | Brink . |
| 4,921,572 | 5/1990 | Roche . |
| 4,971,086 | 11/1990 | Haug et al. . |
| 4,978,516 | 12/1990 | Yamada et al. . |
| 5,006,490 | 4/1991 | Logan et al. . |
| 5,019,291 | 5/1991 | Faulks . |
| 5,034,075 | 7/1991 | McMath . |
| 5,034,247 | 7/1991 | Batdorf . |
| 5,039,365 | 8/1991 | Rutledge, Sr. et al. . |
| 5,041,277 | 8/1991 | Mirick . |
| 5,085,838 | 2/1992 | Mason . |
| 5,091,053 | 2/1992 | Blonder et al. . |
| 5,096,692 | 3/1992 | Ek . |
| 5,143,757 | 9/1992 | Skinner . |
| 5,240,508 | 8/1993 | Gwilliam . |
| 5,258,131 | 11/1993 | Mirick et al. . |
| 5,258,562 | 11/1993 | Mirick et al. . |
| 5,264,655 | 11/1993 | Mirick et al. . |
| 5,317,056 | 5/1994 | Batdorf et al. . |
| 5,330,795 | 7/1994 | Batdorf et al. . |
| 5,439,322 | 8/1995 | Barnett . |
| 5,466,489 | 11/1995 | Stahl . |
| 5,514,222 | 5/1996 | Williams . |
| 5,516,973 | 5/1996 | Mirick et al. . |
| 5,543,120 | 8/1996 | Selby . |

OTHER PUBLICATIONS

Nanova et al, Khim. Ind. (Sofia) 47(3), 108–110 (1975) no month.

Podobaev et al, Izv. Vyssh. Ucheb. Zaved., Kim. Teknol., 11(9), 1106–1116 (1968) no month.

Ling et al, Corrosion, 51, 367–375 (1995) no month.

Allah et al, Hungarian J. of Ind. Chem., 23, 11–19 (1995) no month.

Oza et al, Trans. Of Met. Fin. Ass. of India, 3(4), 9–14 (1994) no month.

*Primary Examiner*—Michael Marcheschi
*Attorney, Agent, or Firm*—Howard J. Troffkin

[57] ABSTRACT

A composition for transforming a chrysotile asbestos-containing material into a non-asbestos material is disclosed, wherein the composition comprises water, at least about 30% by weight of an acid component, optionally a source of fluoride ions, and a corrosion inhibiting amount of thiourea, a lower alkylthiourea, a $C_8$–$C_{15}$ alkylpyridinium halide or mixtures thereof. A method of transforming an asbestos-containing building material, while part of a building structure, into a non-asbestos material by using the present composition also is disclosed.

7 Claims, No Drawings

CORROSION INHIBITING COMPOSITION FOR TREATING ASBESTOS CONTAINING MATERIALS

This invention was made with Government support under contract DE-AC02-76CH00016 awarded by the Department of Energy. The Government has certain rights to this invention.

RELATED APPLICATIONS

This application is related to the following commonly assigned applications, which have been filed simultaneously herewith and the disclosures of which have been incorporated herein by reference in their entirety:

(1) Ser. No. 08/721,854, filed Sep. 27, 1996, entitled COMPOSITION AND METHOD TO REMOVE ASBESTOS;

(2) Ser. No. 08/721,859, filed Sep. 27, 1996, entitled COMPOSITION AND METHOD TO REMOVE ASBESTOS;

(3) Ser. No. 08/721,856, filed Sep. 27, 1996, entitled COMPOSITION AND METHOD TO REMOVE ASBESTOS;

(4) Ser. No. 08/721,858, filed Sep. 27, 1996, entitled COMPOSITION AND METHOD TO REMOVE ASBESTOS;

(5) Ser. No. 08/721,863, filed Sep. 27, 1996, entitled COMPOSITION AND METHOD TO REMOVE ASBESTOS; and (6) Ser. No. 08/721,857, filed Sep. 27, 1996, entitled FOAM COMPOSITION FOR TREATING ASBESTOS-CONTAINING MATERIALS AND METHOD OF USING SAME.

BACKGROUND OF THE INVENTION

This invention relates to methods and compositions for digesting chrysotile form of asbestos ("chrysotile asbestos") into non-asbestos material while the chrysotile asbestos is a component of a gypsum-containing cementitious composite and especially to methods and compositions for the in-place digestion of chrysotile asbestos present in composite material that is bonded to a support structure.

Chrysotile asbestos is a serpentine asbestos fibrous-like material consisting of alternating layers of silica and magnesium oxide/hydroxide bound to each other through covalently shared oxygen.

At least in part because of its availability and unique fire resistance and thermal properties, chrysotile asbestos has been used commercially in a variety of building products, including, for example, fire resistant roofing shingles, acoustical plasters, fire resistant and thermally insulating coating compositions and the like. In the formation of fire resistant coating compositions, found to be appropriate for treatment by the present invention, small amounts of chrysotile asbestos were mixed with a settable bonding material comprising gypsum (e.g. calcium sulfate hemihydrate) and, optionally, other materials such as vermiculite and the like. The composition was then applied to a structure where it forms a hardened coating. For example, such compositions found considerable use in multi-story buildings wherein the gypsum-containing composition was applied as an adherent coating to steel girders, floor support plates, concrete decking and the like to provide fire resistance and high-temperature thermal insulation properties which aid in preventing damage and even possible collapse of such buildings in the event of fire.

In recent years asbestos has been classified as a regulated material in the United States. Federal, state and local government agencies have promulgated regulations dealing with the use and disposal of asbestos-containing building materials. The U.S. Environmental Protection Agency ("EPA") has defined asbestos-containing material ("ACM") as a material which contains greater than one percent (1%) asbestos. In accordance with various regulatory procedures, various safeguards are employed to protect workers from inhaling asbestos fibers during removal or demolition activities. Such safeguards include requiring workers to wear approved respirator or breathing apparatus, as well as protective clothing, requiring any area in a building in which asbestos-containing material is being removed to be isolated or enclosed from the remainder of the building, and requiring the enclosed work area to be kept at a negative pressure by the use of special apparatus equipped with HEPA filters to prevent airborne asbestos fibers from leaving the work area. Such isolation of the work area is an expensive and time-consuming part of the process.

Generally, prior art methods for handling asbestos-containing building materials have taken several approaches. One approach has been to chemically alter asbestos fibers before using them in building products. This approach is discussed, for example, in U.S. Pat. Nos. 4,328,197 and 4,401,636, both to Flowers, and in U.S. Pat. No. 4,474,742 to Graceffa et al.

Greceffa et al (U.S. Pat. No. 4,474,742) teach the treatment of asbestos with hydroxamic acid and iron chelating agents to remove the iron present in the asbestos based on the presumption that the iron is the harmful component. In the Flowers patents (U.S. Pat. No. 4,328,197 and U.S. Pat. No. 4,401,636), one is taught to contact asbestos fibers with an aqueous solution of a weak base/strong acid or a strong base/weak acid salt of manganese, chromium, cobalt, iron, copper or aluminum or mixtures thereof, to convert the asbestos fibers into a metal-micelle product. In general, the process contemplated by Flowers is effected by preparing a slurry of asbestos fibers in an aqueous solution of the appropriate salt, effecting the conversion of the asbestos fibers to metal-micelle fibers in the slurry, and recovering the metal-micelle fibers from the slurry for use in the subsequent preparation of the desired fiber-containing end product.

Another approach is to treat previously formed asbestos-containing building materials by encapsulating the materials with a resinous coating to thereby prevent the asbestos fibers from becoming airborne. A resinous encapsulating coating material typically would be applied by spraying, brushing or troweling. Care must be taken when using encapsulating methods so as not to physically damage the building material being encapsulated. Encapsulation is a containment method and, thus, the encapsulated material remains in place during the life of the building.

A number of removal techniques have been proposed, and each has its advantages and disadvantages. For example, it has been proposed to simply scrape or chip away at dry untreated asbestos-containing material and to collect the scrapings for discard. This technique, which is referred to as dry removal, is generally considered unacceptable by regualtory authorities since it provides no safeguard against the release of airborne asbestos particles.

Dry vacuum methods have been attempted to overcome the problems associated with simple dry removal by incorporating an exhaust filtering system to prevent pollution to the outside environment and by using sealed containers for storing and discarding the collected asbestos-containing material. One of the disadvantages of this method is that the bond between the dry building material and the underlying surfaces on which it is coated may be stronger than the vacuum capabilities of the equipment. In those cases, it is necessary to dislodge at least a portion of the asbestos-containing material by scraping or chipping has the same limitations as the dry removal process described above.

Wet removal processes have been developed as a means for reducing the problems associated with the various dry removal techniques. Wet removal generally involves wetting a building material with water or water-surfactant solution to soften it and to thereby facilitate its removal. Wet removal clearly represents an improvement over dry removal. However, the use of water as a softening agent is not entirely satisfactory because water penetrates slowly, does not completely wet most building materials, and tends to run off the surfaces being treated.

Over the past several years, wet removal techniques have been improved by devising more effective wetting and/or softening compositions. Recent U.S. patents which relate to such improved wet removal techniques include, for example, U.S. Pat. No. 4,347,150 to Arpin; U.S. Pat. No. 4,693,755 to Erziner; and U.S. Pat. No. 5,258,562 to Mirick et al.

The Arpin patent discloses a technique for wetting and removing friable insulating materials from an underlying substrate using a two-part wetting system. The first component of the system comprises an aqueous alkali metal silicate dispersion blended with a cationic or nonionic surfactant and the second component comprises a mixture of an acrylic latex and a reagent that is reactive with the alkali metal silicates in the first part. The two parts are stored separately and are mixed shortly before use to form a stripping composition which facilitates the removal of the building material while encapsulating the individual asbestos fibers contained therein. The removed material must be handled as an asbestos-containing material.

The Erzinger patent exemplifies a wet method for removing asbestos-containing materials from a substrate. This patent discloses applying a composition containing a cellulosic polymer to the asbestos-containing material, allowing the cellulosic polymer-containing composition time to penetrate and wet the asbestos-containing material, removing the wet material from the underlying substrate by mechanical forces, and collecting the removed material for discard.

The Mirick et al patent is centered on the concept of removing asbestos fiber containing building material by applying a dilute aqueous solution of an acid, which may include a separate source of fluoride ions such as an alkali metal or ammonium salt of hydrofluoric acid, to the building material to condition the material and, thereby aid in its removal while partially converting the asbestos fibers. The building material, after having been treated with the dilute acid solution, is preferably removed for further treatment and/or discard. Mirick et al further contemplate that the wet building material, once removed, can then be digested by immersing the material into a bath of an acid solution, preferably with heating and agitation, until all of the asbestos material has been destroyed.

The problems of wet removal techniques include the requirements of dealing with corrosive asbestos treating compositions, such as acidic solutions, and of handling of the wet asbestos-containing material during removal. In addition, the removed material must be further treated to destroy the remaining asbestos component if the material is to be discarded as a non-asbestos-containing material.

When an acidic composition is used to treat an asbestos containing building material, one should be concerned with the potential for corrosion of metal elements in contact with or in close proximity to the building material being treated. Such elements may be in the form of girders and beams, conduits and electrical boxes and the like.

Surfactants have been suggested as an agent which inhibits corrosion of metals caused by acidic materials. However, studies have shown that no generalization can be made, that the corrosion inhibition is dependent on the corrosive system as well as other materials in contact with the metal to be protected. Most studies have been conducted with simple aqueous solutions and, even in such instances, no clear direction is provided.

For example, Nanova et al, *Khim. Ind. (Sofia)*, 47(3), 108–110 (1975), discusses the use of alkylbenzenepyridinium chlorides to inhibit the corrosion of steel in hydrochloric and sulfuric acids. However, Podobaev et al, *Izv. Vyssh. Ucheb. Zaved., Kim. Teknol.*, 11(9), 1106–1116 (1968), discloses that alkylpyridinium chlorides are less effective acid corrosion inhibitors than the alkylbenzenepyridinium chlorides and that these agents are not effective with respect to strong acid concentrations. Ling et al, *Corrosion*, 51, 367–375 (1995), discusses a variety of organic surfactants, which exhibit various degrees of corrosion inhibiting properties. Allah et al, *Hungarian J. of Ind. Chem.*, 23, 11–19 (1995), discusses steel corrosion-inhibition mechanisms for thiourea in hydrochloric acid solutions while Oza et al, *Trans. Of Met. Fin. Ass. Of India*, 3(4), 9–14 (1994), discusses the inhibition mechanism of thiourea analogues for brass in hydrofluoric acid-containing solutions.

There exists a need for a composition capable of treating and decomposing chrysotile asbestos while part of building materials, such as gypsum based materials, while causing an inhibition of destructive corrosion of metal elements normally in contact with or proximate to such buliding materials.

SUMMARY OF THE INVENTION

The object of the present invention is to provide an improved composition and method for treating gypsum containing cementitious building materials which contain chrysotile asbestos to transform the building material to non-regulated materials (i.e., materials which contain less than 1% chrysotile asbestos therein) while the building material is part of building environment and is to remain part of the building structure. The present invention is specifically directed to an acidic treatment composition which is capable of transforming chrysotile asbestos-containing building material to a non-regulated material which is also capable of inhibiting corrosion to steel and other metal elements in contact with or proximate to the treated building material. Thus, the present invention provides a composition capable of transforming a chrysotile asbestos containing material to a non-regulated material without causing detrimental corrosion to metal elements in contact with or proximate to the treated building material.

The present invention utilizes an aqueous acidic composition which contains a corrosion inhibiting amount of a thiourea and/or an alkylpyridinium halide, as fully described herein below.

DETAILED DESCRIPTION OF PREFERRED EMBODIMENTS

The present invention is intended for the treatment of gypsum-containing cementitious materials which contain chrysotile asbestos fibers to transform the building materials to non-asbestos materials. The present invention is especially useful for digesting chrysotile asbestos fibers contained in gypsum-based building materials that have been previously applied to the structural components, such as steel beams, decking and the like of buildings. The building material is generally composed of a cementitious binder such as gypsum, a porous particulate, such as vermiculite, and a minor amount of chrysotile asbestos.

The composition of the present invention is an acidic aqueous composition which does not exhibit corrosion to steel building members. The composition contains an acidic component which is highly soluble in water. The acidic component can be selected from inorganic acids including, for example, sulfuric acid, nitric acid, hydrochloric acid, phosphoric acid or their acid salts or mixtures thereof. The most preferred acid is phosphoric acid. When phosphoric acid is employed as the acid component, it can be used alone or in combination with small amounts of up to about 20% by weight of the total acid content, of other inorganic acids. In addition, small amounts (up to about 5%, preferably up to about 2%, by weight of the acid content) can be in the form of an organic acid. Examples of inorganic acid salts are the half acid salts, as, for example, ammonium and alkali metal bisulfates and the like. The preferred salts are the ammonium salts of the half acids.

The acid component may be employed in the present compositions in high concentrations of at least about 30% by weight up to the saturation point of the acid based on the weight of the treating compositions. It is preferred that the acid component be present in from about 30% to about 45% by weight, based on the total weight of the treating composition. Acidic concentrations which are lower than that described above may be used in conjunction with the corrosion inhibiting agent of the present invention in desired applications.

In addition to the acid component, the composition may contain a fluorine-containing salt which is soluble in the aqueous treating compositions in the amounts described hereinbelow. Fluorine-containing salts which may be used in the present treating compositions include, for example, the fluorides, bifluorides, fluoroborates and fluorosilicates of ammonia, alkali metals and alkaline earth metals. Mixtures of such salts also may be used. The preferred fluorine-containing salts are ammonium or alkali metal fluorosilicates and fluoroborates, more specifically, ammonium hexalfuorosilicate, sodium hexafluorosilicate, potassium hexafluorosilicate, ammonium tetrafluoroborate, sodium tetrafluoroborate or potassium tetrafluoroborate and the like. A full description of these preferred salts are described in copending applications having Attorney Reference Numbers 8903, 9032, 9161 and 9225 referred to above, the teachings of which are incorporated herein by reference.

When the fluoride-containing salt is present, its concentration should be at least about 0.1% by weight, based on the total weight of the treating composition, with concentrations in the range of about 0.1 to about 4% by weight being preferred.

Simple fluoride salts, such as ammonium fluoride, ammonium bifluoride, sodium fluoride, sodium bifluoride, potassium fluoride, potassium bifluoride, lithium fluoride and cesium fluoride, may be used in the present treating compositions. However, their use is generally less preferred than the use of a tetrafluoroborate or hexafluorosilicate fluoride ion source.

The present acidic treating composition must contain a corrosion inhibiting component capable of inhibiting corrosion of steel and other metals in contact with or proximate to the building material being treated. The corrosion inhibiting agents of the present invention are particularly useful in applications where the treated building material is to remain a part of the building structure, such as gypsum-based cementitious fireproofing coatings and the like. The treating composition must be capable of penetrating into the gypsum-based material without destroying the integrity and fireproofing properties of the material. The applied acidic treatment composition may come in contact with steel girders, decking and other metal elements which are either in contact with or in close proximity to the treated material. In order to permit the gypsum-based cementitious fireproofing material to remain as a building element, the surrounding metal elements must not be subject to corrosion to a detrimental degree.

Although numerous agents are known to inhibit acid corrosion, they were found to be ineffective in the current application. The particular reason for their lack of effectiveness is not known but may be due to the highly acidic nature of the presently contemplated treatment composition, the components of the gypsum-based cementitious material which may react with or cause decomposition of the agents or other unknown reasons.

It has been unexpectedly found that thiourea and alkylpyridinium halides provide corrosion inhibition in the applications contemplated herein.

The thiourea corrosion inhibitors which have been found to be useful in the present treating compositions include, for example, thiourea, per se, and lower ($C_1$–$C_3$) alkylthioureas, such as diethylthiourea. The thiourea corrosion inhibitors, when used, should be present in the treating composition at a concentration of at least about 0.0001M. Preferably, the concentration of the thiourea corrosion inhibiting component is from about 0.0005 to about 0.1M, although concentrations of the thiourea in excess of 0.1M may be employed.

The alkylpyridinium halide corrosion inhibitors which have been found to be useful in the present treating compositions include, for example, the $C_8$–$C_{15}$ alkylpyridinium halides, such as dodecylpyridinium chloride and dodecylpyridinium bromide. When used, the alkylpyridinium halide corrosion inhibitors should be present in the treating composition at a concentration of at least about 0.001M. Preferably, the concentration of the alkylpyridinium halide corrosion inhibiting component is from about 0.005 to about 0.5M, although concentrations of the alkylpyridinium halide in excess of 0.5M may be employed.

The present treatment composition may be readily applied to chrysotile asbestos containing cementitious coatings material in any manner so that from about 8 to 20 parts by weight, preferably 9 to 15 parts by weight, of the aqueous treating composition is applied per part by weight of the chrysotile asbestos in the material being treated. The amount to be applied will depend on the amount of chrysotile asbestos initially present in the material, the concentration of the acid in the treating composition and the thickness and absorptive capacity of the material being treated. The exact amount can be readily determined by small scale application and testing.

Since the thiourea and/or alkylpyridinium halide corrosion inhibiting component has been found to inhibit the corrosion of metallic substrate materials (e.g. steel beams, galvanized corrugated decking, steel pipes and the like) to which the material being treated is attached and/or in the vicinity thereof, the present composition may be used, without taking any extraordinary precautions, when the material being treated is contained in a building which is intended for further occupancy after the material has been treated.

The method of the present invention transforms chrysotile asbestos-containing material into a material which contains very little, if any, chrysotile asbestos when measured, for example, by polarized light microscopy, X-ray diffraction, or other conventional method. The resultant treated material contains less than one percent (1%), and normally less than one-half of one percent (0.5%) chrysotile asbestos in the overall structure of the resultant material. Thus, the material treated by the present composition results in a product which meets the U.S. governmental standards of a non-regulated material which may be safely handled by ordinary means. Further, it has been unexpectedly found that the present composition and method provides this transformation without causing a degradation of the cementitious material and, thereby, permits the material to remain in place and to continue to provide the functions of fire resistance, etc. for which it was initially installed.

The present composition can be applied by ordinary means such as, for example, by spraying, brushing or the like. Where, for example, the chrysotile asbestos-containing building material is in the form of fireproofing material coated on girders, beams and floor support plates, application can be done by spraying the treating composition in the form of a solution, dispersion, gel or foam (e.g., a foam which is stable for at least about 1 minute, and preferably for at least about 60 minutes) directly onto the asbestos-containing material, in place in the building environment. It is usually unnecessary to disturb the asbestos-containing materials since the treating compositions will penetrate into the building materials and contact the asbestos fibers contained therein. In those cases where it is desirable to increase the rate of penetration of the treating composition into the building material, one or more wetting agents may be added to the treating composition.

The present treating composition should be applied to the gypsum-containing cementitious building material in manners which permit a total application of from about 100 to 200% by weight, preferably from about 125 to about 175% by weight, of the subject composition based on the weight of the cementitious building material. The exact amount will depend upon the concentration of chrysotile asbestos contained in the building material.

The desired asbestos-containing material transformation may be achieved by a single application of the treating composition on the building material while it is in place in the building environment. However, in some cases it may be necessary or desirable to make successive applications, preferably without any intermediate drying step, until the desired transformation of the chrysotile asbestos fibers is achieved.

The preferred manner of applying the subject treating composition to the material is by applying the composition in the form of a foam directly onto the major free surface(s) of the building material. As the material to be treated is in the form of a coating on a substrate building component, usually one major surface is exposed and free for application of the subject composition. Spraying of the aqueous treating composition may require successive applications, preferably without any intermediate drying step(s) between applications. Application of a foamed aqueous treating composition provides an extended contact time and a pseudo-encapsulation of the material being treated while the transformation is occurring. The formation of the foamed composition and its specific utilization in the instant method of transforming chrysotile asbestos-containing building materials to non-asbestos materials is fully described in concurrently filed, copending U.S. application Ser. No. 08/721,857, filed Sep. 27, 1996, entitled FOAM COMPOSITION FOR TREATING ASBESTOS-CONTAINING MATERIALS AND METHOD OF USING SAME, the disclosure of which is incorporated herein by reference.

It has been found that when a chrysotile asbestos-containing material is transformed in place in accordance with the present invention, the physical integrity and adherence of the resulting non-asbestos material to the underlying substrate are such that it may be left in place to perform the fireproofing or other function for which the asbestos-containing material was originally installed.

The following examples are intended to illustrate the invention without imposing limits on the scope thereof of the invention, as defined by the claims appended hereto. All parts and percentages are by weight unless otherwise indicated.

EXAMPLE 1

A series of mild steel coupons (3 inches long, by ½ inch wide, by $\frac{1}{16}$ inch thick, and having a $\frac{5}{16}$ inch diameter hole drilled ¼ inch from one end thereof) were prepared for testing by degreasing with hexane and acetone. Each coupon was weighed and suspended vertically in 65 ml of the treating composition indicated in Table 2 using a Teflon rod. The concentration of the indicated corrosion inhibitor in each respective treating composition, other than the "blank", was 0.01M. The "blank" treating compositions contained no corrosion inhibiting component. After 24 hours, the coupons were removed from their respective treating compositions, and each was washed with water, dried and weighed. The weight loss for each coupon was converted to the standard corrosion rate unit of mils per year (mpy) by the formula: mpy=11406 (initial weight/final weight). The treating compositions (before the addition of the corrosion inhibiting component) used in this example are set forth in Table 1.

TABLE 1

| Components | Composition 1 parts by wt. | Composition 2 parts by wt. |
|---|---|---|
| NaHSO4 | 4.5 | 0 |
| H3PO4 | 0 | 4.25 |
| (NH4)2SiF6 | 0.05 | 0.1 |
| H2O | 4.5 | 4.75 |
| Liquid/solid | 1.5 | 1.5 |
| pH | 0.20 | 0.77 |

TABLE 2

| | Corrosion Rate (mpy) | |
|---|---|---|
| Corrosion Inhibitor | Composition 1 | Composition 2 |
| Blank (no corrosion inhibitor) | 637 | 1406 |
| NaNO3 | 745 | |
| 1-octyn-3-ol | 688 | |
| tetraethylenediamine | 612 | |
| dibenzylsulfoxide | 664 | |
| 5-carboxybenzotriazole | 547 | |
| benzenethiol | 582 | |
| tannic acid | 559 | 945 |
| diethylthiourea | 53 | 52 |

The data of Table 2 clearly establishes that diethylthiourea was the only tested agent capable of substantially inhibiting corrosion of steel with respect to the strong acidic compositions.

EXAMPLE 2

The procedure of Example 1 was followed, except that several additional acidic treating compositions were formulated and used. Each of the treating compositions formulation is set forth in Table 3 below, and the respective observed corrosion rates for each composition alone and with an inhibiting agent as taught by the present invention is also set forth.

TABLE 3

| Component | Comp. 1 | Comp. 2 | Comp. 3 | Comp. 4 | Comp. 5 | Comp. 6 | Comp. 7 | Comp. 8 | Comp. 9 | Comp. 10 |
|---|---|---|---|---|---|---|---|---|---|---|
| | | | | | parts by wt. | | | | | |
| $(NH_4)_2SiF_6$ | 0.05 | 0.10 | 0.10 | 0.25 | 0.25 | 0 | 0 | 0 | 0 | 0 |
| $H_2O$ | 4.5 | 4.75 | 6.6 | 6.0 | 10 | 4.5 | 4.75 | 6.6 | 6.0 | 10 |
| $NaHSO_4$ | 4.5 | 0 | 0 | 0 | 0 | 4.5 | 0 | 0 | 0 | 0 |
| $H_3PO_4$ | 0 | 4.25 | 0 | 0 | 0 | 0 | 4.25 | 0 | 0 | 0 |
| $H_2SO_4$ | 0 | 0 | 2.4 | 0 | 0 | 0 | 0 | 2.4 | 0 | 0 |
| Tartaric Acid | 0 | 0 | 0 | 6.00 | 0 | 0 | 0 | 0 | 6.0 | 0 |
| Citric Acid | 0 | 0 | 0 | 0 | 10 | 0 | 0 | 0 | 0 | 10 |
| Corrosion Rate mpy | | | | | | | | | | |
| Blank | 923 | 1296 | 2060 | 81 | 55 | 932 | 1287 | 2106 | 123 | 67 |
| 0.01M Thiourea | 79 | 51 | 81 | 22 | 22 | 75 | 73 | 97 | 31 | 26 |
| 0.01M Diethylthiourea | 11 | 10 | 9 | 6 | 8 | 13 | 14 | 24 | 9 | 9 |

The data indicates that the corrosion rates for the compositions containing either thiourea or diethylthiourea, as a corrosion inhibiting component, are significantly lower than the corrosion rates for the compositions that do not contain any corrosion inhibiting component.

EXAMPLE 3

The procedure of Example 2 was repeated, except that the treating compositions were aged for one week prior to being used for the 24 hour immersion test. In this example, only compositions 1, 2 and 3 were used. The results of the tests are summarized in Table 4.

TABLE 4

| | Corrosion Rate (mpy) | |
|---|---|---|
| Composition | Fresh Composition | Composition Aged One Week |
| Comp. 1 (no inhibitor) | 923 | 915 |
| Comp. 1 (0.01M Thiourea) | 79 | 75 |
| Comp. 1 (0.01M Diethylthiourea) | 11 | 26 |
| Comp. 2 (no inhibitor) | 1296 | 1287 |
| Comp. 2 (0.01M Thiourea) | 51 | 75 |
| Comp. 2 (0.01M Diethylthiourea) | 10 | 14 |
| Comp. 3 (no inhibitor) | 2060 | 2026 |
| Comp. 3 (0.01M Thiourea) | 81 | 93 |
| Comp. 3 (0.01M Diethylthiourea) | 9 | 18 |

EXAMPLE 4

The procedure of Example 1 was repeated, except that diethylthiourea was the only corrosion inhibiting component that was used. In compositions 11-14, the concentration of diethylthiourea was 0.01M. In compositions 15-18, the concentration of diethylthiourea was 0.005M. In compositions 19-22, the concentration of diethylthiourea was 0.001M. In compositions 23-26, the concentration of diethylthiourea was 0.0005M. The composition and corrosion rate for each composition is set forth in Table 5.

TABLE 5

| Components | Comp. 11 | Comp. 12 | Comp. 13 | Comp. 14 | Comp. 15 | Comp. 16 | Comp. 17 | Comp. 18 | Comp. 19 | Comp. 20 |
|---|---|---|---|---|---|---|---|---|---|---|
| | | | | | parts by wt. | | | | | |
| $(NH_4)_2SiF_6$ | 0 | 0 | 0 | 0 | 0 | 0 | 0 | 0 | 0 | 0 |
| $H_2O$ | 4.5 | 4.75 | 6.6 | 6.0 | 4.5 | 4.75 | 6.6 | 6.0 | 4.5 | 4.75 |
| $NaHSO_4$ | 4.5 | 0 | 0 | 0 | 4.5 | 0 | 0 | 0 | 4.5 | 0 |
| $H_3PO_4$ | 0 | 4.25 | 0 | 0 | 0 | 4.25 | 0 | 0 | 0 | 4.25 |
| $H_2SO_4$ | 0 | 0 | 2.4 | 0 | 0 | 0 | 2.4 | 0 | 0 | 0 |
| Tartaric Acid | 0 | 0 | 0 | 6.0 | 0 | 0 | 0 | 6.0 | 0 | 0 |
| Conc. of Diethythiourea | 0.01 | 0.01 | 0.01 | 0.01 | 0.005 | 0.005 | 0.005 | 0.005 | 0.001 | 0.001 |
| Corrosion Rate (mpy) | 16 | 12 | 18 | 9 | 45 | 11 | 17 | 10 | 97 | 27 |

| Components | Comp. 21 | Comp. 22 | Comp. 23 | Comp. 24 | Comp. 25 | Comp. 26 |
|---|---|---|---|---|---|---|
| | | | parts by wt. | | | |
| $(NH_4)_2SiF_6$ | 0 | 0 | 0 | 0 | 0 | 0 |
| $H_2O$ | 6.6 | 6.0 | 4.5 | 4.75 | 6.6 | 6.0 |
| $NaHSO_4$ | 0 | 0 | 4.5 | 0 | 0 | 0 |
| $H_3PO_4$ | 0 | 0 | 0 | 4.25 | 0 | 0 |
| $H_2SO_4$ | 2.4 | 0 | 0 | 0 | 2.4 | 0 |

TABLE 5-continued

| | | | | | | |
|---|---|---|---|---|---|---|
| Tartaric Acid | 0 | 6.0 | 0 | 0 | 0 | 6.0 |
| Conc. of Diethylthiourea | 0.001 | 0.001 | 0.0005 | 0.0005 | 0.0005 | 0.0005 |
| Corrosion Rate (mpy) | 32 | 15 | 598 | 87 | 94 | 77 |

EXAMPLE 5

The procedure of Example 1 was followed, except that the duration of the tests was increased to one week (instead of 24 hours) and only phosphoric acid-based compositions were tested. In addition, the tests were run on coupons made of galvanized steel, in addition to coupons made of A36 steel (A36). The treating compositions of this Example are set forth in Table 6, along with the corrosion results.

TABLE 6

| Components | Comp. 27 | Comp. 28 parts by wt. | Comp. 29 |
|---|---|---|---|
| $H_3PO_4$ (g) | 4.25 | 4.25 | 4.25 |
| $(NH_4)_2SiF_6$ (g) | 0.10 | 0.10 | 0.10 |
| $H_2O$ (g) | 4.75 | 4.75 | 4.75 |
| Conc. of Diethylthiourea (M) | 0 (Blank) | 0.005 | 0.01 |
| Corrosion Rate (mpy) A36 Steel | 417 | 5 | 45 |
| Corrosion Rate (mpy) Gal. Steel | 311 | 62 | 77 |

EXAMPLE 6

The procedure of Example 5 was repeated, except that the pH of the treating compositions was adjusted to the indicated value by adding sodium hydroxide. The compositions indicated as being "Blank" contained no corrosion inhibiting component, whereas the compositions indicated as being "Inhibited" contained 0.005M diethylthiourea. The results of this Example are set forth in Table 7.

TABLE 7

| | | Corrosion Rate at Indicated Treating Comp. pH (mpy) | | | | | |
|---|---|---|---|---|---|---|---|
| Coupon | Treating Comp. | pH 2 | pH 3 | pH 4 | pH 5 | pH 6 | pH 7 |
| A36 | Blank | 925 | 547 | 85 | 47 | 39 | 27 |
| A36 | Inhibited | 6.9 | 1.4 | 5 | 2.7 | 1.3 | 2.8 |
| Galvanized | Blank | 514 | 464 | 405 | 12 | 95 | 113 |
| Galvanized | Inhibited | 401 | 405 | 316 | 9 | 61 | 83 |

EXAMPLE 7

Several phosphoric acid-based treating compositions were prepared using the indicated concentration of dodecylpyridinium chloride as the corrosion inhibiting (C.I.) component. The compositions which did not contain any dodecylpyridinium chloride are identified as "Blank" compositions. The various treating compositions were used to test the corrosion rate on coupons of A36 steel, mild steel, and galvanized steel, in accordance with the procedure set forth in Example 1. The composition of the various treating compositions are set forth in Table 8, and the corrosion rate results are set forth in Table 9.

TABLE 8

| Component | Low Acid Comp. (Blank) | Low Acid Comp. (Inhibited) | High Acid Comp. (Blank) | High Acid Comp. (Inhibited) |
|---|---|---|---|---|
| $H_3PO_4$ (g) | 0.5 | 0.5 | 3.5 | 3.5 |
| $H_2O$ (g) | 5.5 | 5.5 | 5.5 | 5.5 |
| $(NH_4)_2SiF_6$ (g) | 3.0 | 3.0 | 0.15 | 0.15 |

TABLE 9

| | Corrosion Rate (mpy) | | |
|---|---|---|---|
| Treating Composition | A36 | Mild Steel | Galv. Steel |
| Low Acid - Blank | 446 | 108 | 380 |
| Low Acid - 0.005M (C.I.) | 25 | 27 | 396 |
| Low Acid - 0.01M (C.I.) | 24 | 20 | 416 |
| Low Acid - 0.05M (C.I.) | 11 | 10 | 411 |
| Low Acid - 0.1M (C.I.) | 8 | 5 | 386 |
| High Acid - Blank | 1790 | 1049 | 796 |
| High Acid - 0.005M (C.I.) | 64 | 31 | 447 |
| High Acid - 0.01M (C.I.) | 52 | 27 | 417 |
| High Acid - 0.05M (C.I.) | 20 | 4 | 401 |
| High Acid - 0.1M (C.I.) | 16 | 7 | 398 |

EXAMPLE 8

A fireproofing composition was prepared by forming a mixture containing 68.2 parts of gypsum, 31.6 parts of vermiculite and 0.2 parts sodium dodecylsulfate with water to form a paste. The fireproofing composition was applied as a one inch thick coating onto a series of 3 inch square steel plates. 1.5 times the weight of treating composition was applied to the top of each plate based on the weight of fireproofing coating. The plates were allowed to stand at room temperature for either 1 week or 2 weeks prior to measuring the amount of corrosion in mpy. For purposes of comparison, this Example included runs where a "Blank" (no treating agent) was used, as well as runs where the treating composition did not include any corrosion inhibiting component. The treating compositions that were used for this Example were prepared by adding either diethylthiourea (DETU) at a concentration of 0.005M or dodecylpyridinium chloride (DDPC) at a concentration of 0.01M to the phosphoric acid-based High Acid composition set forth in Example 7. The results of this Example are set forth in Table 10.

TABLE 10

| | Corrosion Rate (mpy) | | | |
|---|---|---|---|---|
| | Mild Steel | | Galv. Steel | |
| Treating Comp. | one week | two weeks | one week | two weeks |
| Blank (no acid) | 9 | 5.5 | 0.4 | 1.0 |
| High Acid/No C.I. | 19 | 13 | 27 | 9 |
| 0.005M DETU | 17 | 11.3 | 15 | 8 |
| 0.01M DDPC | 5 | 9.8 | 5 | 8 |

EXAMPLE 10

The procedure of Example 1 was repeated except the treating composition was the phosphoric acid-based High Acid composition set forth in Example 7. The "Blank" treating composition had no added corrosion inhibiting component. The remaining treating compositions each contained 0.01M of the agent indicated in Table 11. The corrosion rate in mil per year (mpy) for each of the coupons tested is set forth in Table 11. Only the alkylpyridinium chlroide salt acted as a corrosion inhibitor with respect to the treating composition.

TABLE 11

| Treating Composition | Corrosion Rate (mpy) | | | | |
|---|---|---|---|---|---|
| | A36 | Mild Steel | Galv. Steel | Copper | Aluminum |
| Blank | 1596 | 1842 | 756 | 2.7 | 1066 |
| Dodecyl-pyridinium Chloride | 52 | 27 | 417 | 2.7 | 1044 |
| 2-Furaldehyde* | 287 | 265 | 461 | 3.5 | 1033 |
| Aniline* | 1531 | 1751 | 796 | 3.9 | 1184 |
| Pinacolone* | 1562 | 1734 | 794 | 3.6 | 1201 |
| 2-Pyridinecar-boxaldehyde* | 1371 | 1442 | 719 | 4.0 | 1191 |
| Triallylamine* | 478 | 308 | 484 | 4.1 | 1253 |
| Quinoline* | 1476 | 927 | 651 | 3.8 | 1279 |
| Brucine* | 336 | 239 | 497 | 3.4 | 1140 |
| Hexamethyl-aminetetra-mine* | 255 | 110 | 453 | 3.4 | 1155 |
| Tributylamine* | 567 | 227 | 504 | 3.2 | 1063 |
| Acridine* | 621 | 450 | 567 | 3.8 | 1066 |
| Oxalic acid* | 1671 | 1817 | 827 | 3.3 | 1246 |

*Comparative Samples

The data in Table in Table 11 indicates that the use of dodecylpyridinium chloride as a corrosion inhibiting component in a phosphoric acid-based treating composition in accordance with the invention results in a significantly lower corrosion rate than for any of the other known corrosion inhibiting agents that were tested, particularly when tested on A36 and mild steel coupons.

What is claimed is:

1. A method of treating a cementitious building material containing chrysotile asbestos, wherein said building material has been applied to a substrate in a building, comprising:
   (a) providing an admixture composition derived by admixing (i) water, (ii) at least about 30% by weight of an inorganic acid, an inorganic acid salt or mixtures thereof, and (iii) a corrosion inhibiting amount of a corrosion inhibiting component selected from the group consisting of thiourea, lower alkylthioureas, $C_8$–$C_{15}$ alkylpyridinium halides and mixtures thereof;
   (b) applying said admixture composition to the chrysotile asbestos-containing building material;
   (c) permitting said admixture composition to penetrate into the building material and contact the chrysotile asbestos contained therein; and
   (d) allowing said composition to remain in contact with the chrysotile asbestos for a sufficient period of time to reduce the amount of chrysotile asbestos contained therein to less than 1% by weight.

2. The method of claim 1, wherein the building material is a gypsum-containing cementitious building material.

3. The method of claim 2, wherein said composition further contains a fluoride salt selected from the group consisting of hexafluorosilicate or tetrafluoroborate salts of alkali metal, alkaline earth metal or ammonium and mixtures thereof.

4. The method of claim 3, wherein said corrosion inhibiting component comprises thiourea or diethylthiourea or mixtures thereof present in a concentration of at least about 0.0001M.

5. The method of claim 3, wherein said corrosion inhibiting component comprises dodecylpyridinium chloride or dodecylpyridinium bromide or mixtures thereof present in a concentration of at least about 0.005M.

6. The method of claim 3, wherein the acid component (i) is phosphoric acid present in a concentration of from about 30 to about 45 weight percent, and wherein the fluoride salt is an ammonium or alkali metal fluoroborate or fluorosilicate or mixtures thereof present in a concentration of from about 0.1 to about 4 percent by weight based on the total weight of said composition.

7. The method of any one of claims 1, 2, 3, 4, 5 or 6, wherein said composition is applied to the building material in an amount of from about 8 to about 20 parts by weight based on the weight of chrysotile asbestos contained in the building material being treated.

* * * * *